United States Patent [19]
Pinney

[11] Patent Number: 5,085,113
[45] Date of Patent: * Feb. 4, 1992

[54] CUTTER TEETH ASSEMBLY

[76] Inventor: J. Dana Pinney, P.O. Box 877, Medford, Oreg. 97501

[*] Notice: The portion of the term of this patent subsequent to Nov. 21, 2006 has been disclaimed.

[21] Appl. No.: 637,594

[22] Filed: Jan. 3, 1991

Related U.S. Application Data

[63] Continuation of Ser. No. 370,697, Jun. 23, 1989, Pat. No. 4,989,489, which is a continuation-in-part of Ser. No. 335,423, Apr. 10, 1989, Pat. No. 4,922,791, which is a continuation of Ser. No. 124,673, Nov. 24, 1987, Pat. No. 4,881,438, which is a continuation-in-part of Ser. No. 929,636, Nov. 12, 1986, abandoned, which is a continuation-in-part of Ser. No. 754,761, Jul. 15, 1985, abandoned.

[51] Int. Cl.⁵ .............................................. B27B 33/12
[52] U.S. Cl. ...................................... 83/840; 83/844; 83/848; 83/834
[58] Field of Search ................ 83/835, 837, 839, 840, 83/841, 844, 846, 848, 833, 834

[56] References Cited

U.S. PATENT DOCUMENTS

| | | |
|---|---|---|
| 646,284 | 3/1900 | Hilton . |
| 869,574 | 10/1907 | Huther . |
| 1,334,633 | 3/1920 | Pioche .................................. 83/848 |
| 1,988,898 | 1/1935 | Hafner . |
| 2,508,784 | 5/1950 | Cox . |
| 2,622,636 | 12/1952 | Cox . |
| 2,947,331 | 8/1960 | Irgens . |
| 2,958,348 | 11/1960 | Bueneman . |
| 2,992,664 | 7/1961 | DeShano . |
| 3,144,891 | 8/1964 | Carlton . |
| 3,344,822 | 10/1967 | Wilder . |
| 3,346,025 | 10/1967 | Anderson et al. . |
| 3,425,467 | 2/1969 | Willis ................................. 83/839 X |
| 3,581,785 | 6/1971 | Neumeier . |
| 3,745,870 | 7/1973 | Lemery ................................. 83/833 |
| 3,929,049 | 12/1975 | Graversen ............................. 83/834 |
| 4,348,927 | 9/1982 | Olmr .................................... 83/833 |
| 4,563,929 | 1/1986 | Ringlee et al. ........................ 83/840 |
| 4,581,968 | 4/1986 | Gibson et al. ......................... 83/833 |
| 4,590,836 | 5/1986 | Doiron ................................. 83/834 |
| 4,625,610 | 12/1986 | Petrovich ............................. 83/834 |
| 4,627,322 | 12/1986 | Hayhurst, Jr. ........................ 83/831 |
| 4,744,148 | 5/1988 | Brown .................................. 30/276 |
| 4,782,731 | 11/1988 | Huntington ........................... 83/837 |
| 4,785,700 | 11/1988 | Petrovich et al. .................... 83/834 |
| 4,813,325 | 3/1989 | Gelman ................................. 83/844 |
| 4,881,438 | 11/1989 | Pinney ................................. 83/840 |
| 4,911,050 | 3/1990 | Nitschmann ........................... 83/834 |
| 4,922,791 | 5/1990 | Pinney ................................. 83/840 |
| 4,989,489 | 2/1991 | Pinney ................................. 83/840 |

FOREIGN PATENT DOCUMENTS 1194641 11/1959 France .
20418 12/1960 German Democratic Rep. .
80528 3/1934 Sweden .

Primary Examiner—Frank T. Yost
Assistant Examiner—Eugenia A. Jones
Attorney, Agent, or Firm—Chernoff, Vilhauer, McClung & Stenzel

[57] ABSTRACT

Circular brush cutting blade for powered brush cutter has cutting teeth arranged in pairs on periphery of blade, the teeth in pairs being of alternate right and left configuration and closely spaced together, the pairs of teeth being relatively widely spaced apart on the blade. Means are provided to engage the kerf sides and deflect the blade toward its central plane as it engages the material being cut.

13 Claims, 3 Drawing Sheets

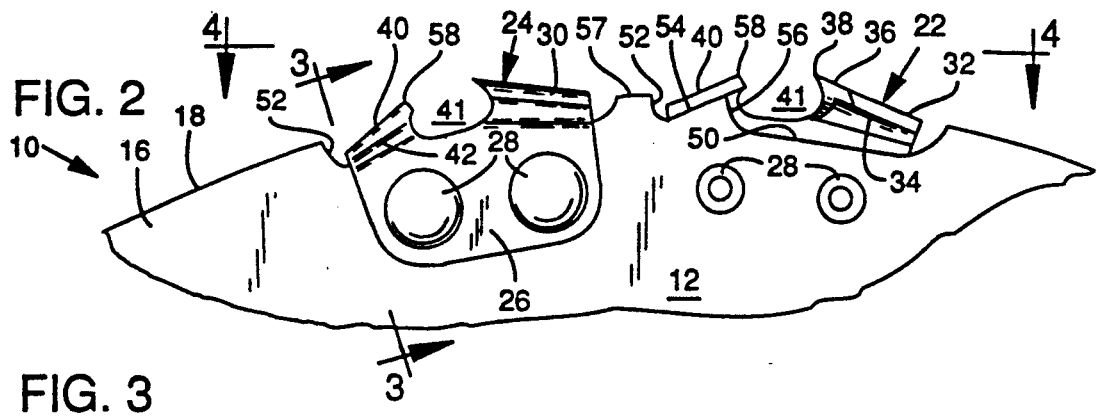
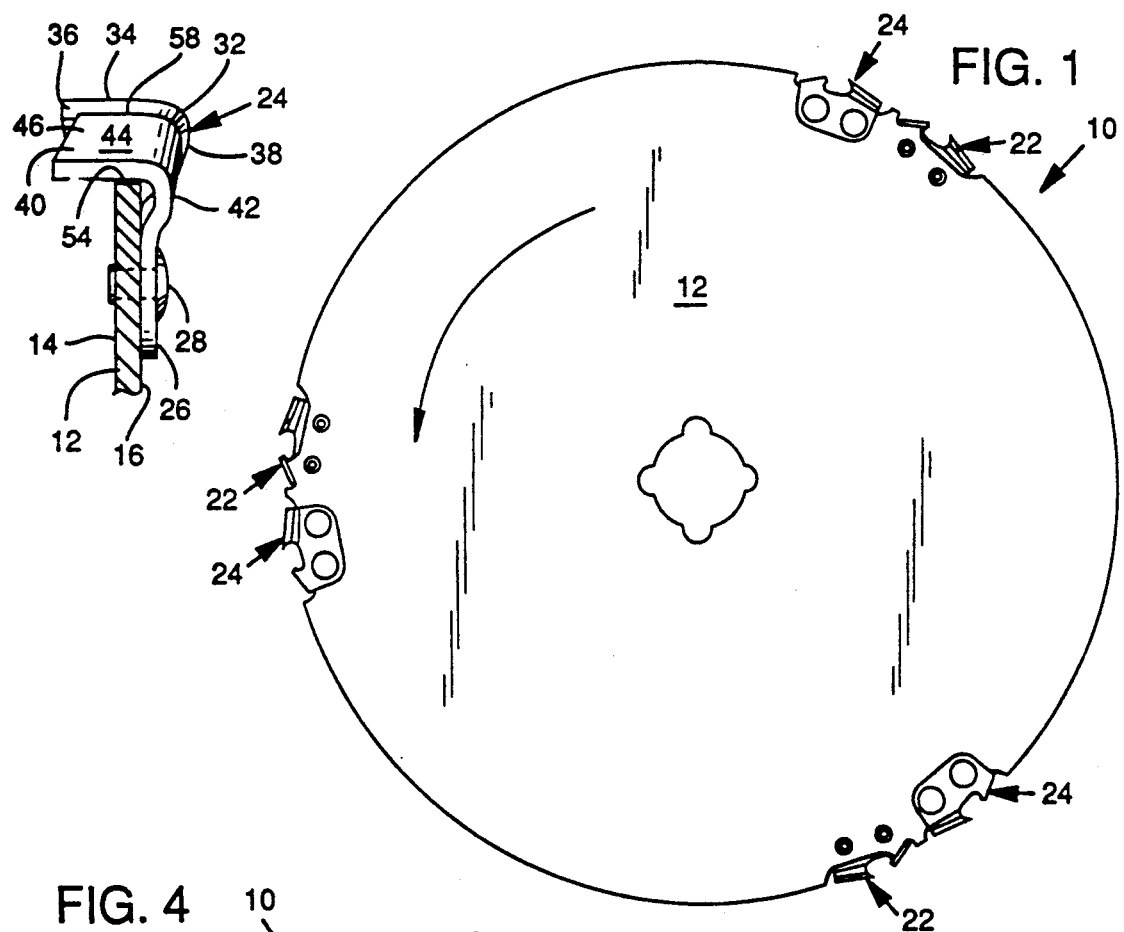
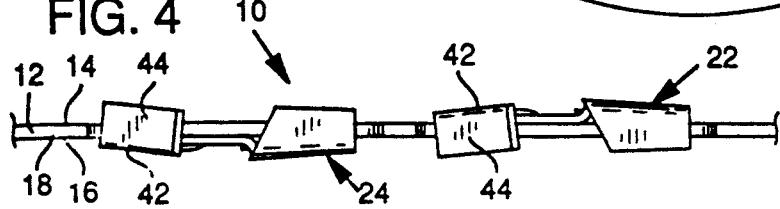

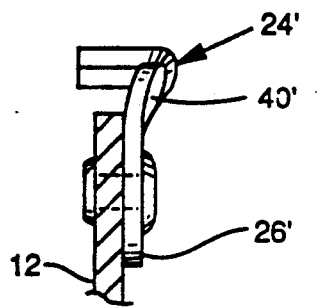
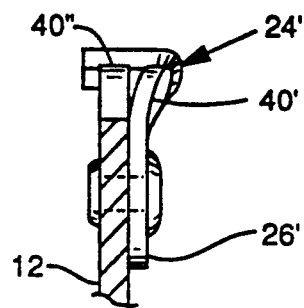
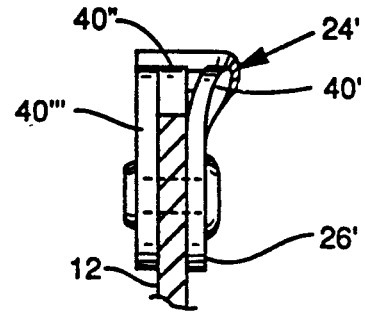
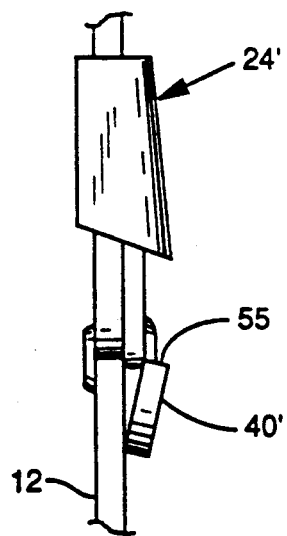
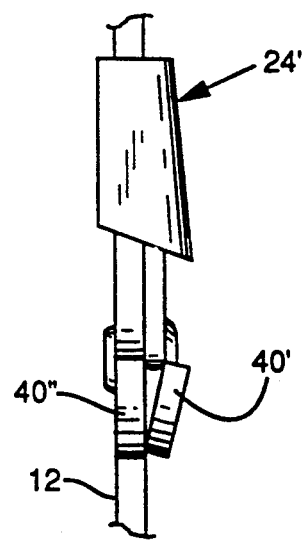
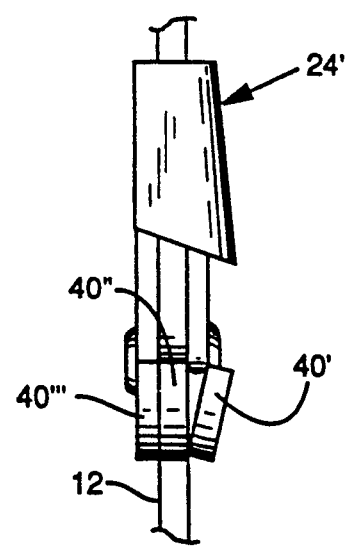

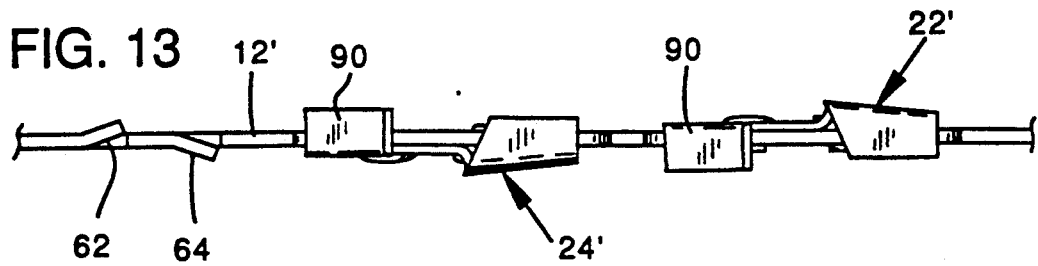
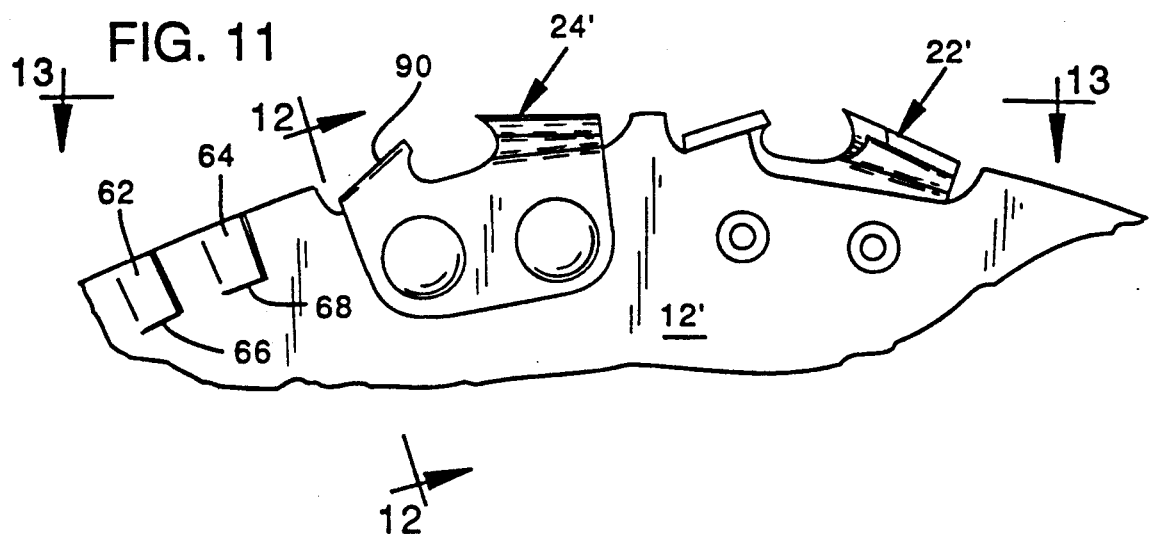
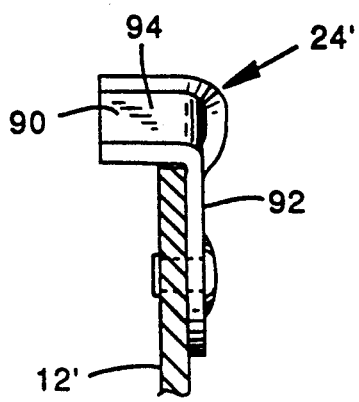

CUTTER TEETH ASSEMBLY

The present application is a continuation of my prior application Ser. No. 370,697, filed June 23, 1989, now U.S. Pat. No. 4,989,489, which is a continuation-in-part of Ser. No. 335,423, filed Apr. 10, 1989, now U.S. Pat. No. 4,922,791, which is a continuation of Ser. No. 124,673, filed Nov. 24, 1987, now U.S. Pat. No. 4,881,438, which is a continuation-in-part of Ser. No. 929,636, filed Nov. 12, 1986, now abandoned, which is a continuation-in-part of Ser. No. 754,761, filed July 15, 1985, now abandoned.

The present invention relates to a cutter blade for cutting brush, small trees and like and, more particularly, to a new and improved arrangement of cutting teeth in such a blade.

BACKGROUND OF THE INVENTION

Circular blades driven by a motor, electric or gas powered, have been used for a number of years for cutting brush and small trees. Such blades are generally mounted on the end of a manually supported arm with the blade rotating in a substantially horizontal plane to cut upright brush and small trees, although the blade can cut in any position. Some prior blades were formed with offset teeth formed in the blade much like a handsaw. Such blades are inefficient and slow cutting.

Circular blades for various purposes have been provided with teeth such as are used in cutting chains for chain saws secured thereto in evenly spaced relation. Blades of this type are shown in U.S. Pat. Nos. 869,574; 1,988,898; 2,992,664; and 3,425,467; Swedish Patent No. 80,528; and French Patent No. 1,194,641. Other blades had lengths of saw chain secured to their periphery, e.g. U.S. Pat. Nos. 2,958,348; 4,563,929; and 4,627,322. A common problem with such blades was their tendency occasionally to "kick back," that is, to give a sudden, forceful and uncontrolled reaction that caused the blade and supporting elements to move suddenly away from the piece being cut. Such "kick backs" have been a source of many injuries. An improved form of such a blade is shown in my U.S. Pat. No. 4,881,438, This blade is characterized by having a plurality of saw chain teeth equally spaced about the periphery of the blade, each of the teeth being formed with a wide ramp or depth gauge preceding the cutting edge. Such blades had much reduced kick back as compared to prior blades and are substantially safer in use. Nonetheless, it is desirable that a brush cutting blade evidence as little kick back force as possible to negate the possibility of an injury producing reaction.

SUMMARY OF THE INVENTION

It is an object of the present invention to provide an improved circular brush cutting blade.

More particularly, it is an object to provide a circular brush cutting blade with substantially negligible kick back reaction.

Another object is to provide a brush cutting blade with substantially less kick back than prior blades, but with improved cutting efficiency.

Other objects and advantages will become more apparent hereinafter.

In accordance with the illustrated embodiments of the invention, the foregoing objects are achieved by providing a brush cutting blade comprising a circular disc having several pairs of cutting elements mounted thereon, the cutting elements comprising cutting edges extending transversely of the disc, the pairs being of right and left hand configuration. The cutting elements of each pair are spaced closely together circumferentially, whereas the pairs of cutter elements are widely spaced from each other. Such a blade cuts with a high degree of efficiency, but exhibits little tendency to kick back.

DRAWINGS

FIG. 1 is a side elevation of a preferred form of cutter blade made in accordance with the invention;

FIG. 2 is an enlarged side elevation of a portion of the blade of FIG. 1;

FIG. 3 is a sectional view taken along line 3—3 of FIG. 2;

FIG. 4 is a top view looking in direction of arrows 4—4 of FIG. 2;

FIG. 5 is a front view of a modified cutter mounted on a blade;

FIG. 6 is a top view of the cutter of FIG. 5;

FIG. 7 is a front view of another arrangement of the cutter of FIGS. 5 and 6 showing a modification of the blade structure;

FIG. 8 is a top view of the arrangement of FIG. 7;

FIG. 9 is a front view of still another arrangement of the cutter of FIGS. 5 and 6 showing a modification of the blade and mounting of the cutter;

FIG. 10 is a top view of the arrangement of FIG. 9;

FIG. 11 is a side elevation of a portion of a blade and a pair of cutters showing a modified form of the invention;

FIG. 12 is a sectional view taken along line 12—12 of FIG. 11; and

FIG. 13 is a top view looking in the direction of the arrows 13—13 of FIG. 11;

DETAIL DESCRIPTION OF THE INVENTION

With reference first to FIGS. 1-4, the preferred form of cutter blade 10, made in accordance with the invention, comprises a circular disc 12 having opposite planar sides 14, 16 and a smooth, generally continuous periphery 18. Attached to the disc 12 adjacent its periphery are a plurality of right hand cutter teeth 22 and alternating left hand cutter teeth 24. The cutter teeth are mounted in pairs, each pair constituting one right hand and one left hand cutter. The cutters in each pair are relatively closely spaced circumferentially, but the pairs are relatively widely spaced apart. More will be said of the spacing subsequently.

The cutter teeth 22, 24 are substantially identical, other than being opposite hand, and in numerous respects, particularly in the cutter configuration, resemble teeth commonly used in saw chain. Because of this identity, only a left hand tooth 24 will be described in detail. The cutter tooth 24 comprises a flat plate portion 26 which abuts the left disc side surface 16, the tooth being rigidly secured to the disc by suitable fastener means, such as rivets 28. The tooth 24 is formed with a single cutter element 30 consisting of a kerf side wall cutting portion 32 and a kerf bottom cutting or flange portion 34. As best shown in FIG. 3, the side wall cutting portion 32 is laterally offset from the plate portion 26, the offset decreasing from the forward to the rearward end thereof to provide clearance for the following portions of the tooth. The flange portion 34 extends from the side wall cutting portion 32 substantially at a right angle to the disc side surfaces 14, 16 so as to extend beyond the right disc side surface 14. The forward edge of the side wall portion 32 and flange 34 is formed with a beveled surface 36 defining a continuous cutting edge 38.

Each cutter tooth 24 is provided with a ramp or depth gauge 40 integral with the forward end of the plate portion 26 and positioned forwardly of the cutter element 30 to define a gullet 41 between the cutter element and depth gauge 40. The depth gauge 40 comprises a shank portion 42 and top plate portion 44 which extends across the blade from said shank portion substantially perpendicularly to the blade side surface. The top plate portion 44 defines an upwardly facing flat surface 46 which slopes upwardly from its forward edge toward the cutting edge 38.

While the illustrated tooth is of so-called chipper tooth design, such as shown in U.S. Pat. No. 2,508,784, such a tooth having a rounded side wall kerf cutting portion 32, the configuration of the sidewall cutting portion is not critical and other commonly used configurations could be used so long as the tooth top plate or flange portion 34 forms a kerf bottom cutting element. For example, the tooth could be of chisel bit design as shown in U.S. Pat. No. 2,622,636 or semichisel design as shown in U.S. Pat. No. 3,144,891 or any of the other commonly used saw chain tooth configurations.

Referring more particularly to FIG. 2, the periphery of the disc 12 is formed with a cutaway 50 opposite each tooth so that the teeth may be mounted on the disc with certain portions of the teeth recessed below the periphery of the disc. Thus, the right hand tooth 22 is mounted opposite a cutaway 50 including a forward portion 52 receiving the depth gauge top plate 44, the forward portion 52 being shaped so that the bottom surface of the depth gauge top plate engages a cooperatively inclined surface 54 which supports the depth gauge. The cutaway 50 includes a rear portion 56 opposite the tooth gullet 41 and cutter 30, the portion 56 being sufficiently deep that the tooth cutting edge 38 may be sharpened with a file or grinding element extending across the tooth and blade. The rear cutaway portion 56 preferably extends beyond the rearmost portion of the tooth flange 34 so as to provide clearance for wood chips cut by the cutting edge 38.

The teeth 22, 24 are each mounted to the blade preferably so that the depth gauge surface 46 slopes upwardly at an angle of between twenty-five and thirty-five degrees with respect to a plane parallel to the axis of the disc and normal to a radius of the disc intersecting the trailing edge 58 of the depth gauge top plate 44, and with said trailing edge positioned above the arc of the blade periphery 18 between about 0.025 and 0.035 inch. As shown in FIG. 2, the depth gauge is positioned on the blade such that the arc of the blade periphery 18 intersects the depth gauge surface 46.

The flange portion 34 of a tooth inclines downwardly at a small acute angle, preferably between about seven and ten degrees, with respect to a perpendicular to a radius of said disc intersecting the forward edge of the flange portion, the cutting edge of the flange portion projecting beyond the arc of the disc periphery 18 by between about 0.020 and 0.045 inch beyond the depth gauge projection. The tooth is preferably mounted so that the trailing edge of the top surface of the flange portion 34 is flush with the arc of the disc periphery 18.

The foregoing arrangement of clearance of the cutting edge of the flange portion 34 and the depth gauge allows a tooth to be sharpened repeatedly, at each sharpening lowering the depth gauge by the same amount as the cutting edge on the flange portion 34 is lowered by filing down the depth gauge at its trailing edge 58 in the customary manner of sharpening a saw chain tooth to maintain the desired cutting edge clearance, until the depth gauge has been lowered to the point where its top surface is flush with the arc of the blade periphery 18. At this point the cutting edge 38 will have a clearance of at least 0.020 inch above the periphery of the blade 18 which will permit it to cut material effectively.

The purpose of providing the teeth in pairs of right and left configuration with the substantial spacing between the pairs is to provide smoothness in the cutting operation, reduce the drag imposed upon the saw blade as it progresses through the wood, reduce kick back, and improve the blade cutting efficiency.

When the teeth are evenly and relatively closely spaced around the edge of a blade as has been the practice in the past, there is not enough space between teeth to permit the smaller engines to recover engine speed after it slows during the progress of a tooth through the brush that is being cut. Thus, the engines labor. Spacing separate cutters widely also provides either a hard left or a hard right pull on the individual cutters, thus deflecting the blade so that the blade is out of a centered position for the following cutter. This creates a vibration or "chatter" that can be detected by the operator, and can cause a blade to wander, increasing kerf width and decreasing the blade's efficiency. However, when the teeth are in pairs, there is an almost instant left-right pull on the blade, minimizing its deflection and leaving the blade in a relatively balanced position for the next set of cutters. As a result, a blade with widely spaced cutter pairs operates more smoothly and efficiently.

Traditional blade technology was to provide a blade so that there was at least one and preferably two teeth in a cut at all times. I have found that providing a blade having teeth in widely spaced apart pairs, there are brief periods with no teeth in the cut. The pause period provided between the cuts enables the small, high speed motors used with brush cutters to recover their lost speed and the motors operate more smoothly and efficiently. The space between teeth pairs needs to be longer for smaller motors than for larger more powerful motors. For example, a 20 cc. gas engine would successfully operate a nine inch blade with three equidistantly spaced pairs of teeth, but would not operate well with a nine inch blade with four equidistantly spaced pairs of teeth. By contrast, a large gasoline engine of 64 cc. could successfully function in a brush cutter with a ten inch blade with six equidistantly spaced pairs of teeth. Thus, the optimum spacing between pairs of teeth will depend upon the horsepower of the engine propelling the blade and the blade diameter, but, in any case, the spacing between pairs should be several times the length of a tooth or the spacing between teeth. Ordinarily, saw chain teeth are of the order of ⅜ to 1" in length. Thus, a brush cutting machine powered by an engine of small horsepower and driving a 12" blade may accommodate only three pairs of teeth on the blade. On the other hand, an 8" blade driven by an engine of large horsepower, may be able to accommodate six pairs of teeth.

With respect to the spacing between the cutter teeth of a pair, that is the left and right cutters of a pair, the closer such teeth are spaced peripherally the less chatter and drag will occur and the higher the cutting efficiency. However, from a practical standpoint, it is preferable that a trailing tooth of a pair be spaced from the leading tooth so as to provide a segmental portion of the disc periphery, indicated at 57, between such tooth. The segmental portion 57 will protect the trailing tooth of a pair if a leading tooth is damaged or broken. The preferred spacing between individual cutter teeth of a pair is about 0.250 inch, but may vary between 0.150 to greater than one inch in some instances.

Preferably, means are provided on the blade to deflect the blade towards the central plane of the blade as the blade rotates into the kerf. Blades tend to wander, particularly blades of larger diameter using larger cutters, that is having greater than $\frac{1}{2}''$ spacing between rivet openings. This wandering of the blade makes it difficult to start into a cut since the blade will tend to walk up or down the face of the material being cut. The wandering of the blade will also cause the blade to cut a wider kerf, greatly reducing cutting efficiency.

In the embodiment of the invention illustrated in FIGS. 1-4, a deflecting means is embodied in the depth gauge 40. As will be seen in FIGS. 3 and 4, the shank portion of the depth gauge is reversely curved portion and outwardly from the plate 26 and thence back over the center line of the tooth wherein it forms the depth gauge top plate 44. As best shown in FIG. 4, the shank portion 42 is inclined outwardly from the forward edge of the tooth so as to provide an inclined planing surface. The slope of this surface should be between about 4° to 12°, preferably about 8°, with respect to the blade surfaces 14, 16. The trailing edge of the reversely curved depth gauge portion 42 should provide at least between about 0.020 to 0.035 inches clearance for the cutting edge 38 formed on the kerf sidewall cutting portion 32.

While the configuration of the depth gauge described above is preferred, other configurations may be utilized. For example, a standard depth gauge such as shown in U.S. Pat. Nos. 2,508,784 and 2,622,636, or the more sloping depth gauge of U.S. Pat. No. 3,929,049 may be used. Referring to FIGS. 5 and 6, there is therein illustrated a left hand cutter tooth 24' having a depth gauge 40' thereon of the width of the sheet material from which the tooth is formed. While such depth gauge 40' may be co-planar with the flat plate portion 26' of the tooth, preferably the depth gauge is canted outwardly from its front to the trailing edge 55 thereof as best shown in FIG. 6 to provide a deflecting means to deflect the blade toward the central plane of the blade as it enters a kerf. Use of single width depth gauges will, however, give rise to increased kickback force, but because of the recessing of the teeth and their arrangement in widely spaced apart pairs, the kickback will be substantially less than for blades with evenly and closely spaced teeth.

The width of the depth gauge can be effectively increased also by providing a ramp 40'' on the periphery of the disc as shown in FIGS. 7 and 8 matching the ramp or slope of the cutter link depth gauge 40'. In addition, an opposing side plate 57 with a matching ramp 40''' can be positioned on the disc so that the depth gauge in effect is made up of three adjacent members as shown in FIGS. 9 and 10. In both of these embodiments, the depth gauge 40' on the cutter element is preferably canted outwardly as described in connection with FIGS. 5 and 6. Because of the greater width of the depth gauge surface provided by the double and triple ramps, they will have greater effectiveness in reducing kickback force than the single width depth gauge but will not be as satisfactory as the embodiment of FIGS. 1 to 4.

Alternatively, a deflecting means may be provided by wings 62, 64 on the disc 12 of right and left configuration, respectively, as shown in FIGS. 11 to 13, positioned in front of a pair of teeth 22', 24'. The wings 62, 64 are formed on the disc 12 immediately preceding each pair of teeth such as by forming a pair of L-shaped cuts 66, 68 to permit the wings 62, 64, respectively, to be bent outwardly from the blade. The teeth 22', 24' are provided with depth gauges 90 which in this instance comprise a planar shank 92 and an inclined top plate portion 94.

As indicated earlier, blades made in accordance with the described embodiments run more smoothly, have less tendency to kick back and cut more effectively than prior blades of which I am familiar.

Having illustrated and described a preferred embodiment of the invention and certain modifications thereof, it will become apparent to those of skill in the art that the invention permits further modification in arrangement and detail. I claim all such modifications as come within the purview of the appended claims.

I claim:

1. A cutter teeth assembly comprising:
   (a) a plurality of cutter teeth of alternating left and right configuration;
   (b) a member interconnecting said teeth to enable them to be moved in a predetermined forward direction;
   (c) each of said teeth comprising a flat, planar base portion having opposite, parallel side surfaces, a sidewall kerf cutting portion integral with said base portion extending upwardly therefrom and having an offset to one side of said base portion, and a kerf bottom cutting portion extending from said sidewall kerf cutting portion transversely across the plane of said base portion, said sidewall kerf cutting portion and said kerf bottom cutting portion each having a respective forward edge formed with a beveled surface defining a cutting edge adapted to cut a kerf in a workpiece of greater width than the width of said base portion between said side surfaces;
   (d) a depth gauge element positioned forwardly of said cutting edge, said depth gauge element having an upwardly-extending sidewall portion and having a top plate extending substantially at a right angle to said sidewall portion transversely across the plane of said base portion a distance greater than said width of said base portion, said top plate having a forwardly-facing transverse leading edge and a rearwardly-facing transverse trailing edge and defining an upwardly-facing planing surface sloping upwardly from said transverse leading edge to said transverse trailing edge toward said cutting edge, said transverse trailing edge of said top plate and said forward edge of said kerf bottom cutting portion being located at different respective heights above said base portion; and
   (e) means mounting said depth gauge element for maintaining said transverse trailing edge of said top plate at a height below that of said forward edge of said kerf bottom cutting portion regardless of whether or not said cutter teeth are cutting said work-piece.

2. The assembly of claim 1 wherein said depth gauge element is integral with said base portion and is defined by an upward extension of said base portion.

3. The assembly of claim 1 wherein said member interconnecting said teeth has an upper extremity extending upwardly at least as high as said transverse leading edge of said top plate.

4. The assembly of claim 1 wherein said sidewall portion of said depth gauge element is canted out of the plane of said base portion sloping transversely rearwardly toward said offset of said sidewall kerf cutting portion.

5. The assembly of claim 1 wherein said member interconnecting said teeth is a circular disk having a periphery to which said teeth are attached.

6. A cutter teeth assembly comprising:
(a) a plurality of cutter teeth of alternating left and right configuration;
(b) a member interconnecting said teeth to enable them to be moved in a predetermined forward direction;
(c) each of said teeth comprising a flat, planar base portion having opposite, parallel side surfaces, a sidewall kerf cutting portion integral with said base portion extending upwardly therefrom and having an offset to one side of said base portion, and a kerf bottom cutting portion extending from said sidewall kerf cutting portion transversely across the plane of said base portion, said sidewall kerf cutting portion and said kerf bottom cutting portion each having a respective forward edge formed with a beveled surface defining a cutting edge adapted to cut a kerf in a workpiece of greater width than the width of said base portion between said side surfaces;
(d) a depth gauge element positioned forwardly of said cutting edge, said depth gauge element having an upwardly-extending sidewall portion and having a top plate extending substantially at a right angle to said sidewall portion transversely across the plane of said base portion a distance greater than said width of said base portion, said top plate having a forwardly-facing transverse leading edge and a rearwardly-facing transverse trailing edge and defining an upwardly-facing planing surface sloping upwardly from said transverse leading edge to said transverse trailing edge toward said cutting edge;
(e) said member interconnecting said teeth having an upper extremity extending upwardly at least as high as said transverse leading edge of said top plate.

7. The assembly of claim 6 wherein said depth gauge element is integral with said base portion and is defined by an upward extension of said base portion.

8. The assembly of claim 6 wherein said sidewall portion of said depth gauge element is canted out of the plane of said base portion sloping transversely rearwardly toward said offset of said sidewall kerf cutting portion.

9. The assembly of claim 6 wherein said member interconnecting said teeth is a circular disk having a periphery to which said teeth are attached.

10. A cutter teeth assembly comprising:
(a) a plurality of cutter teeth of alternating left and right configuration;
(b) a member interconnecting said teeth to enable them to be moved in a predetermined forward direction;
(c) each of said teeth comprising a flat, planar base portion having opposite, parallel side surfaces, a sidewall kerf cutting portion integral with said base portion extending upwardly therefrom and having an offset to one side of said base portion, and a kerf bottom cutting portion extending from said sidewall kerf cutting portion transversely across the plane of said base portion, said sidewall kerf cutting portion and said kerf bottom cutting portion each having a respective forward edge formed with a beveled surface defining a cutting edge adapted to cut a kerf in a workpiece of greater width than the width of said base portion between said side surfaces;
(d) a depth gauge element positioned forwardly of said cutting edge, said depth gauge element having an upwardly-extending sidewall portion and having a top plate extending, from a juncture with said sidewall portion, substantially at a right angle to said sidewall portion transversely across the plane of said base portion a distance greater than said width of said base portion, said top plate having a forwardly-facing transverse leading edge and a rearwardly-facing transverse trailing edge and defining an upwardly-facing first planing surface sloping upwardly from said transverse leading edge to said transverse trailing edge toward said cutting edge;
(e) said sidewall portion of said depth gauge element being canted out of the plane of said base portion sloping transversely rearwardly toward said offset of said sidewall kerf cutting portion, said sidewall portion of said depth gauge element being bent at a first location below said juncture toward said offset of said sidewall kerf cutting portion, and being bent oppositely at a second location above said first location and below said juncture, so as to define a side-facing second planing surface between said second location and said juncture sloping transversely rearwardly toward said offset of said sidewall kerf cutting portion.

11. The assembly of claim 10 wherein said sidewall portion of said depth gauge element is integral with said base portion and is defined by an upward extension of said base portion.

12. The assembly of claim 10 wherein said member interconnecting said teeth has an upper extremity extending upwardly at least as high as said transverse leading edge of said top plate.

13. The assembly of claim 10 wherein said member interconnecting said teeth is a circular disk having a periphery to which said teeth are attached.

* * * * *